Aug. 28, 1962

G. W. COOK 3,051,884

ANGULAR ACCELEROMETER SENSING SYSTEMS
AND CONTROL METHODS AND APPARATUS

Filed Dec. 30, 1958

INVENTOR.
GEORGE W. COOK

BY

Curtis, Morris & Safford
ATTORNEYS

FIG. 4

United States Patent Office 3,051,884
Patented Aug. 28, 1962

3,051,884
ANGULAR ACCELEROMETER SENSING SYSTEMS AND CONTROL METHODS AND APPARATUS
George W. Cook, Washington, D.C., assignor to Thiokol Chemical Corporation, Bristol, Pa., a corporation of Delaware
Filed Dec. 30, 1958, Ser. No. 783,792
20 Claims. (Cl. 318—457)

This invention relates to angular accelerometer sensing systems and control methods and apparatus. More particularly, the present invention relates to angular accelerometer systems utilizing hydraulic angular accelerometers wherein the pressure differential that is generated between two pressure points indicates the direction and magnitude of the angular acceleration which may be occurring at each instant of time.

According to the present invention, a pressure-differential-indicating hydraulic cell is provided having a number of important advantages for indicating the difference in pressure between the two pressure points. This pressure-differential-indicating cell includes a relatively long length of small diameter tubing or capillary conduit which is filled with fluid and is connected between these two pressure points. The direction of movement and rate of movement of the fluid through this capillary conduit at each instant indicates the direction and magnitude of the pressure differential between the two pressure points and this reveals the direction and magnitude of the angular acceleration which may be occurring at each instant.

In the guidance and control of all types of vehicles, ships, vessels, planes, missiles, and the like craft, there is a need for equipment which will sense their turning movements, in other words, which will sense the angular accelerations of these craft. The hydraulic angular accelerometer is a device which can be mounted in fixed position within such craft and provides many advantages in sensing angular accelerations, as explained in my prior copending application entitled "Angular Accelerometer," Serial No. 763,759, filed September 26, 1958. The hydraulic angular accelerometer as described and claimed in said prior application includes a liquid-filled tube which has been formed into a closed path or loop. There is a barrier at one point in the loop so as to prevent any flow of liquid through the tube. Whenever the craft in which this closed loop is mounted experiences a turning movement having a component of angular acceleration in the plane of the loop, then the liquid exerts an increased pressure against one side of the barrier and a decreased pressure against the other side of the barrier. This difference in pressure is caused by the inertia of the mass of liquid in the closed loop, which tends to resist changes in angular velocity.

In the methods and apparatus described herein as illustrative of this invention, an advantageous pressure-differential-indicating hydraulic cell is provided. This hydraulic cell includes a relatively long length of fluid-filled capillary conduit, as mentioned above, which is connected so that its opposite ends communicate with opposite sides of the barrier. Thus, the movement of the fluid back and forth through this capillary conduit serves as an indication of the difference in pressure on opposite sides of the barrier and hence indicates any angular acceleration which may be occurring.

For purposes of measuring the movement of the fluid in the capillary conduit of the hydraulic indication cell, a tiny index element, such as a minute globule of material, is introduced into this capillary conduit. This tiny index element is distinguishable from the remainder of the fluid in the capillary conduit. By sensing the movement of this minute element through the capillary conduit, the movement of the fluid itself and hence the angular acceleration is determined at each instance.

The capillary conduit is provided with an over-all configuration such that its two ends are quite close together, occupying as nearly as possible the same physical space. Thus, any forces imposed upon the fluid in the conduit by gravitational fields or extraneous accelerations such as those produced by machinery vibrations and straight-line accelerations are cancelled out. Also, the various embodiments of hydraulic indication cells described herein utilize capillary conduits following various types of inversion patterns wherein the conduit repeatedly doubles back upon itself in numerous curlycues. In this manner a relatively great length of the conduit is crowded into a small volume of space. Moreover, these inversion patterns have the advantage of preventing the minute index element in the conduit from moving any substantial distance along the conduit except when angular accelerations are truly present. Any extraneous rectilinear motions or gravitational forces which might otherwise tend to cause this index element to drift along the conduit immediately cause it to become "trapped" in one of the numerous curlycues, thus preventing any further drift.

Among the many advantages of the methods and apparatus described herein as embodying the present invention are those resulting from the fact that the fluid in the capillary pressure-differential-indicating conduit in effect produces an integration with respect to time of the angular acceleration. As a result, the position of the tiny index element in the conduit at any instant of time is an indication of the angular velocity of the craft at that instant of time.

In addition, this integrating action averages out and thus effectively cancels out the rapid pressure variations caused by torsional vibrations. It will be appreciated that the framework of any such craft as mentioned above is subjected to various torsional forces, particularly when moving at high rates of speed. Most prior types of guidance and control systems entail the use of numerous delicate moving parts and in operation are required to respond to torsional vibrations in order to keep track of the motion of the craft. However, in marked contrast to this, the hydraulic pressure-differential-indicating cells described herein effectively average out these torsional vibrations and so they provide an accurate indication of the angular velocity of the craft without the necessity of following each and every cycle of vibration.

Among the further advantages of the methods and apparatus described herein are those resulting from the fact that the guidance information provided from the hydraulic cells is suitable for feeding directly into a digital-type master computer. With typical prior pressure responsive devices, the output signal which is obtained varies continuously with continuous variations in pressure. Before such a continuous signal can be fed into a digital computer it must be converted into digital, i.e. step-by-step, information by the use of elaborate analogue-to-digital conversion equipment. Advantageously, the output signals resulting from the methods and apparatus described herein are step-by-step in operation and accordingly are ready to be utilized as is, without requiring conversion.

As described herein, the motion of the index element along the capillary conduit of the hydraulic pressure-differential indicating cell is sensed at a series of discrete positions along the length of the conduit. Each time that the index element moves from one discrete position to the next one along the length of the conduit there is a change in the output by one step in value. Thus, advantageously, the movement of the index element along the conduit is sensed in a step-by-step fashion.

In certain embodiments of the present invention described herein, the index element is of a material having a different light-transmission characteristic from the remainder of the fluid in the capillary conduit. A series of photocells positioned along the conduit are utilized to sense the movement of the index element from one position to the next. For example, the fluid itself is opaque, such as mercury, and the index element is pellucid, preferably transparent, such as a minute globule of water in the mercury. Then, the mercury blocks off the passage of light to all of the photocells except the single one which is adjacent to the transparent index element, thus indicating the position of this element and hence the angular velocity of the craft.

In other embodiments of this invention described herein, the index element is of a material having a different electrical conductivity from the remainder of the fluid in the capillary conduit. A series of electrical contacts communicating with the fluid in the capillary conduit at various positions along the length of the conduit sense the movement of the index element from one position to the next.

In this specification and in the accompanying drawings, are described and shown angular accelerometer sensing systems and control methods and apparatus embodying my invention and various modifications thereof are indicated, but it is to be understood that these are not intended to be exhaustive nor limiting of the invention, but on the contrary are given for purposes of illustration in order that others skilled in the art may fully understand the invention and the manner of applying the method and apparatus in practical use so that they may modify and adapt it in various forms, each as may be best suited to the conditions of a particular use.

The various objects, aspects, and advantages of the present invention will be more fully understood from a consideration of the following specification in conjunction with the accompanying drawings, in which:

FIGURES 4 and 5 show other embodiments of hydraulic pressure-differential-cells wherein the capillary conduits follow inversion patterns which are spirally wrapped around a drum. In FIGURE 4 the movement of the index element is sensed in a step-by-step process by a series of photocells, and in FIGURE 5 a series of electrical contacts are used to sense the movement of the index element in step-by-step manner.

Figure 1:
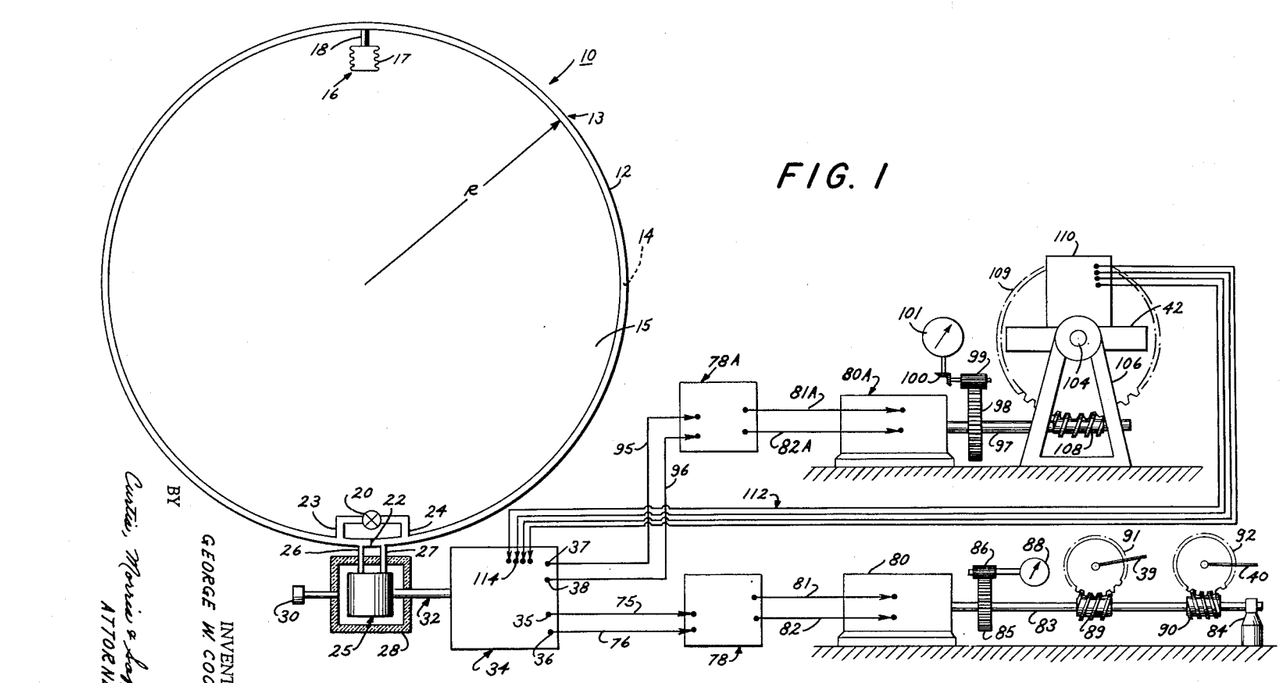
FIGURE 1 is a schematic circuit diagram of angular accelerometer sensing systems and control methods and apparatus embodying the present invention.

As shown in FIGURE 1 angular accelerometer sensing systems and control methods and apparatus embodying this invention include a hydraulic angular accelerometer 10 which is mounted in fixed position on the frame of the craft. This accelerometer is markedly unaffected by extraneous accelerations such as those induced by machinery vibrations, and straight-line accelerations. Also, the accelerometer is unaffected by the gravitational force field about the earth or any other similarly large body. It is unaffected by magnetic or electric fields. It does not include any delicate spinning parts and avoids frictional errors which are involved with such moving parts. Moreover, the accelerometer does not present any problems of bearing or gymbal mounts, for it is rigidly secured with respect to the frame of the craft.

As illustrated this accelerometer 10 includes a rigid tube 12 which has been formed into a closed path or loop 13 of substantial size and is filled with a dense liquid 14. For example, the tube is formed of stainless steel, or Monel metal and has a diameter of 20 feet, being filled with mercury.

Although this loop 13 is indicated as being circular, it is to be understood that the circular shape is the preferred shape and that other shapes are also suitable, for example, elliptical, rectangular, polygonal, and the like. It is not necessary that this loop 13 be regular, symmetrical, nor that it all lie within the same plane. For example, in installing the large loop in a craft, it may be necessary to use an elliptical loop shape, or some irregular loop shape may be required because of restrictions in available space.

However, it will be appreciated that this loop 13 should be as rigid as practically possible, and a regular shape has advantages over an irregular shape for obtaining structural rigidity. A circular loop provides the greatest sensitivity in operation for a given length of tube 12 and for a given area 15 enclosed within the loop. Also, any other loop shapes which most nearly approximate a circular shape will most nearly reach the high sensitivity of the circular loop. The sensitivity increases as the square of the mean radius R of the loop 13, and so a large loop is preferable.

In order to increase the sensitivity for a given radius R, the tube 12 may be made longer and then be coiled into a number of turns of radius R all lying closely adjacent one to another. For proper operation it is required that the diameter of the loop 13 be much larger than the diameter of the bore of the tube 12, and a ratio of at least 100-to-1 will provide satisfactory operation. In this example the loop 13 is 20 feet in diameter, and the tube 12 has an internal diameter of 1 inch, thus giving a ratio of 240-to-1, which is optimum. The details of construction of a suitable multi-turn accelerometer are set forth in my said prior copending application.

In order to accommodate expansion and contraction of the liquid 14 with changes in temperature, there is an expansion bellows unit 16 having a convoluted resilient wall 17. The unit 16 is connected to the interior of the tube 12 through a short pipe 18. The resilient wall 17 is arranged to maintain sufficient pressure on the liquid 14 so as to prevent it from vaporizing, i.e. boiling, under the expected conditions of operation. Because of the changes in pressure occurring at different points along the length of the tube 12 during operation, it is found to be preferable to locate the pipe 18 for the expansion unit 16 at a point which is more or less in equilibrium with respect to operational pressure changes. This equilibrium point is mid-way along the effective length of the tube 12 from either side of the barrier 22.

During operation, a protective by-pass valve 20 is closed, and any mass flow of the liquid in the accelerometer tube is prevented by a rigid barrier 22. It is noted that the by-pass valve is connected to the tube 12 by a pair of connections 23 and 24 on opposite sides of the barrier 22. When this valve is open, the liquid 14 can flow freely around the loop and so there is no significant pressure differential generated on opposite sides of the barrier 22.

Whenever there is a change in angular velocity of the craft involving a component of angular acceleration that is effective in the plane of the loop 13, and assuming the valve is closed, then the inertia of the liquid 14 generates an increase in pressure in the tube 12 against one side of the barrier 22 and a decrease on the other side of this barrier. The magnitude and direction of this differential in pressure is a direct function of the magnitude and direction of the angular acceleration.

In order to respond to this difference in pressure, a hydraulic pressure-differential-indicating cell is provided, diagrammatically indicated in block form at 25, connected to the tube 12 near opposite sides of the barrier 22, by means of first and second connections 26 and 27. Several highly advantageous forms of cells 25 are shown in FIGURES 2, 3, 4, and 5 and will be described in detail in connection with these figures.

For reasons explained in detail below, the hydraulic cell 25 may be affected by changes in viscosity of the fluid therein, and so it is desirable to maintain this cell 25 at a constant temperature. As shown this cell is positioned within a precision temperature-regulated oven 28 having a thermostatic temperature control and heat source 30. For example, this oven 28 is similar to the temperature-regulated ovens which are commercially available for housing standard electrical cells, such as are available from the Eppley Laboratory, Inc. of Newport, R.I.

The electrical output signal from the cell 25 is fed through an electrical cable 32 containing a plurality of individual wires, as will be explained, to a master guidance and control computer 34 of the digital type and having first and second pairs of output terminals at 35 and 36, and 37 and 38, respectively. As will be explained in detail, the signal in the cable 32 has a step-by-step characteristic which makes it well adapted for feeding into the computer 34. This computer controls the motion of the craft by changing the relative attitudes of a pair of oppositely moving control vanes 39 and 40 as well as controlling the position of a reference platform 42 so as to maintain the platform on an even keel, e.g. horizontal athwart the craft with respect to the longitudinal axis of the craft. The directions of operation of the various control and guidance functions are indicated by arrowheads on the respective leads for the convenience of the reader.

Figure 2:
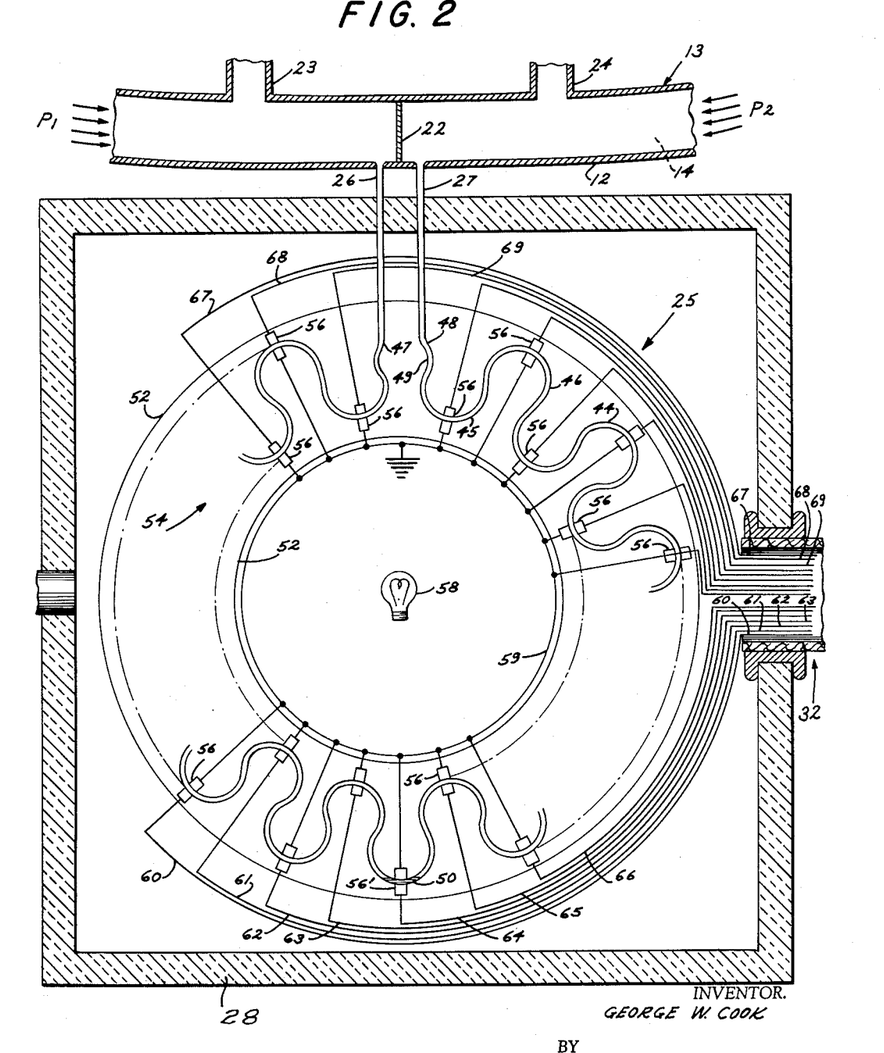
FIGURE 2 illustrates a hydraulic pressure-differential-indicating cell having a capillary conduit following a circular inversion pattern and wherein a step-by-step process senses the movement of the index element along the conduit. A series of photocells are utilized to provide an advantageous step-by-step indication of the changes in angular velocity of the craft.

Before discussing the operation of the remainder of FIGURE 1 in detail, it will be helpful to direct attention to FIGURE 2 which illustrates an embodiment of the hydraulic pressure-differential-indicating cell 25. A relatively long capillary conduit 44 is arranged in a circular inversion pattern. This circular inversion pattern comprises a first loop in one direction, followed by a second inverted loop in the other direction, followed by a third loop in the original direction, and so forth. For example, the conduit 44 progresses along a circular loop 45 and then follows through an inverted circular loop 46, and so forth. In addition, the conduit 44 follows an overall circular path arranged so that its ends 47 and 48 are close together, and these ends communicate with the pressure on opposite sides of the barrier 22 through the connections 26 and 27. The ends of the conduit 44 and the connections 26 and 27 are positioned as closely adjacent one to another as is practicable as shown, so as to minimize the effect of any extraneous forces upon the fluid 49 in the conduit 44. These extraneous forces can arise from machinery vibrations, straight-line accelerations, and the like, as discussed above. For example, in the case of an accelerometer tube 12 having an inside diameter of 1-inch, then a spacing at 45 and 46 of no more than ½ of an inch is satisfactory.

For generation of pressure differentials across the barrier 22 which are directly proportional to the magnitude of the angular acceleration, any significant pressure drop due to mass flow within the tube 12 must be avoided. In this embodiment, the fluid 44 has direct access to the liquid 14 and is identical therewith, for example, being mercury. Thus, to prevent any significant mass flow in tube 12, the cross-sectional area of the capillary bore of the conduit 44 is made less than a maximum of 1/100 of the cross-sectional area within the tube 12. Usually, it is desirable to make the capillary bore far less than this maximum whenever practicable. In cases where the radius "R" of the tube 12 is 5 feet or more, and so its own internal cross section is fairly large, then the area of the capillary bore of conduit 44 can conveniently be made a smaller fraction thereof. In any event, as the following analysis assumes, the cross-sectional area of the bore of the capillary conduit 44 is less than this maximum fraction to prevent mass flow through tube 12.

According to Poiseuille's law, the quantity of fluid that is forced through a tiny tube or capillary conduit is a given time $t$ is:

$$(1) \qquad Q = \frac{p\pi r^4}{8L\eta} t$$

where:

Q is the quantity of fluid forced through
$p$ is the differentially pressure across the conduit 44 from one end to the other
$r$ is the radius of the bore of conduit 44
L is the length of this conduit
$\eta$ is the viscosity of the fluid
$t$ is the length of time the pressure is applied.

In practice, Poiseuille's law holds when certain conditions and requirements are met. For example, the fluid must be essentially homogeneous, and it must be free from foreign particles that might clog the capillary conduit. The conduit must be sufficiently small so that the mass flow of velocity approaches zero, and the circular and rectilinear dimensions of the conduit must be maintained accurately.

An examination of Equation 1 for the evaluation of the quantity Q shows an integration with time and a dependance on viscosity which is controlled by the oven 28. The integration action advantageously signifies a rapid decrease in response with increase in frequency of torsional vibration or rapid cyclic changes in angular acceleration. Thus, pressure variations due to relatively high frequency torsional vibrations are averaged out at a small amplitude, effectively being cancelled out in the step-by-step output signal in cable 32.

In order to sense the movement of the fluid 49, a tiny index element 50 is introduced therein in the form of a minute globule of liquid which has a different light transmission characteristic and is non-mixing with the fluid 49. For example, this element 50 may be pellucid, preferably transparent, such as distilled water, while the fluid 49 is opaque, e.g. mercury. The length of this element 50 should be no more than about one-sixth of the length of the arc of one of the curlycues 45, 46, etc., of the circular inversion pattern.

The capillary conduit 44 is contained in a solid block of plastic material 52 which is transparent, e.g. polymethyl methacrylate which can be obtained commercially from E. I. du Pont de Nemours & Co. under the trademark "Lucite," and from Rohm and Haas Co. under the trademark "Plexiglas." There is an opaque shield 54 within the block 52 extending its full width and closely fitting the pattern of the conduit 44 and lying in the plane of the conduit so as to prevent the transmission of light through the block 52 except where the conduit 44 is present. The opaque fluid 49 itself blocks the passage of light through the area covered by the conduit 44, except for the position of the transparent element 50.

A plurality of small photocells 56 are located closely adjacent to one side of the plane of conduit 44 at a series of uniformly spaced points along its length, and a source of light 58 is positioned on the opposite side of the plane of conduit 44. Each of these photocells 56 is normally non-conducting, for example, such as a selenium cell. But when the index element 50 passes in front of one of them, as seen at the position 56', then it is rendered conducting by the impinging light. Each of these photocells has two terminals. One terminal of the photocell is connected to a common return lead or "ground bus" 59 while the other terminals are connected to individual leads, such as shown at 60, 61, 62, 63, 64, 65, 66, 67, 68 and 69, for example. These individual leads are gathered together into the cable 32 and connect into the digital computer 34.

Whenever angular acceleration takes place the index element 50 moves from one photocell position to the next, thus giving a step-by-step change in the output signal, as conductive paths are successively established between the ground bus 56 and the successive individual leads 64, 63, 62, etc. As an advantage of this system it is noted that the index element 50 remains stationary, whenever constant angular velocity is present. Thus, there is a constant output signal on one of the leads in cable 32, which is indicative of this constant angular velocity.

In operation it is desirable initially to set up the indicating cell 25 with the index element 50 mid-way between the ends 47 and 48 when the craft is at rest with respect to a predetermined reference system. For example, this central position of the element 50 is initially established when the craft is at rest with respect to a predetermined location on the earth. Then, it will be appreciated that the direction and magnitude of the angular velocity of the craft at each instant of time is conveniently indicated by the direction and distance that the index element 50 has moved away from this initial mid-position.

Figure 3:
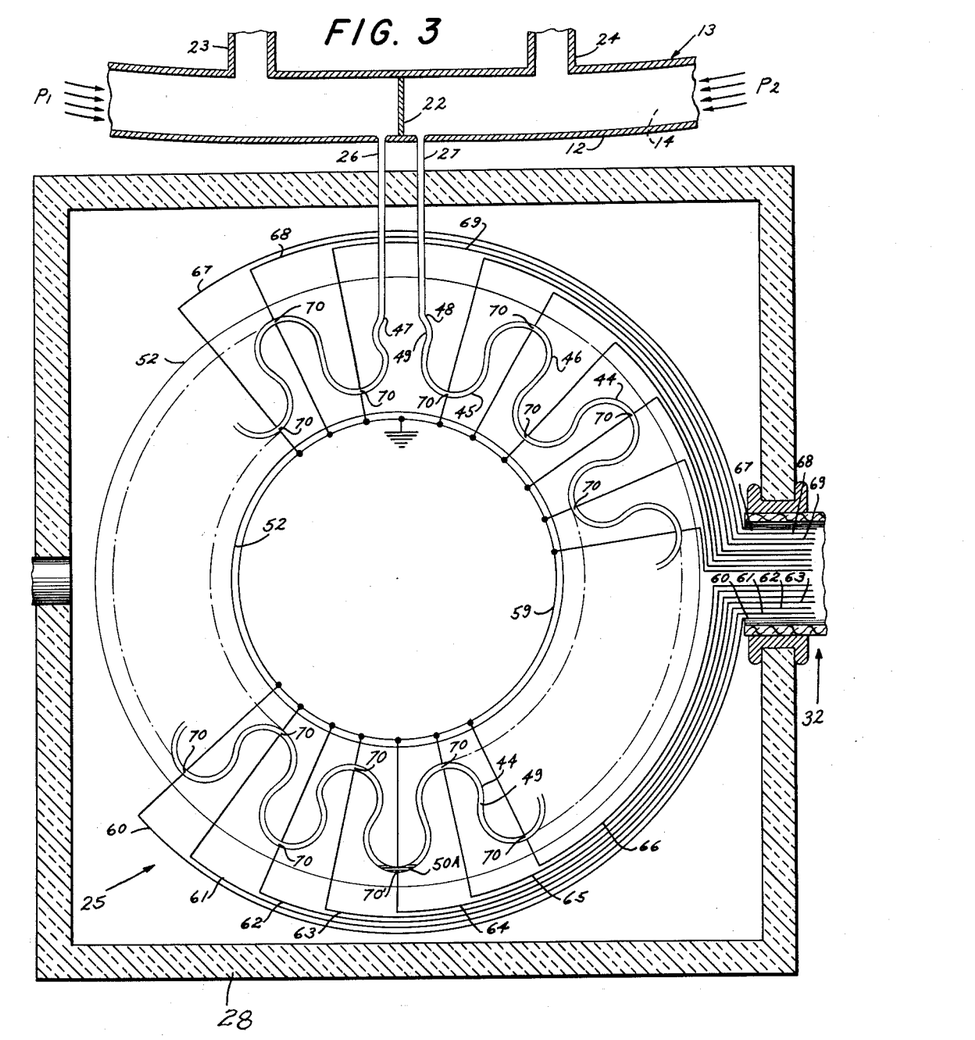
FIGURE 3 illustrates a hydraulic pressure-differential-indicating cell having a capillary conduit similar to that shown in FIGURE 2 and providing a step-by-step output signal by utilizing a series of electrical contacts for providing a step-by-step indication of changes in angular velocity of the craft.

In the remaining figures, parts performing corresponding functions have reference numbers corresponding to those in FIGURE 2. In FIGURE 3 the hydraulic pressure-differential-indicating cell 25 is generally similar to that shown in FIGURE 2, but to sense the movement of the fluid 49, the index element 50A has an electrical conductivity markedly different from that of the remainder of the fluid. For example, the index 50A has a low conductivity compared with the fluid 49, such as a distilled water globule 50A in a mecury-filled condit. Connected in circuit between the common "ground bus" 59 and the individual leads 60, 61, 62, 63, 64, etc., are pairs of electrical contacts 70 which are in communication with opposite sides of the fluid in the conduit. Accordingly, all of the pairs of contacts 70 have a low resistance therebetween except for the particular pair of contacts at 70′ which are immersed in opposite sides of the index element 50A. Thus, the motion of the index 50A from position to position along the conduit 44 is indicated in step-by-step fashion by whichever of the individual leads of the cable 32 has a high resistance in series therewith to the common return circuit 59.

Figure 4:
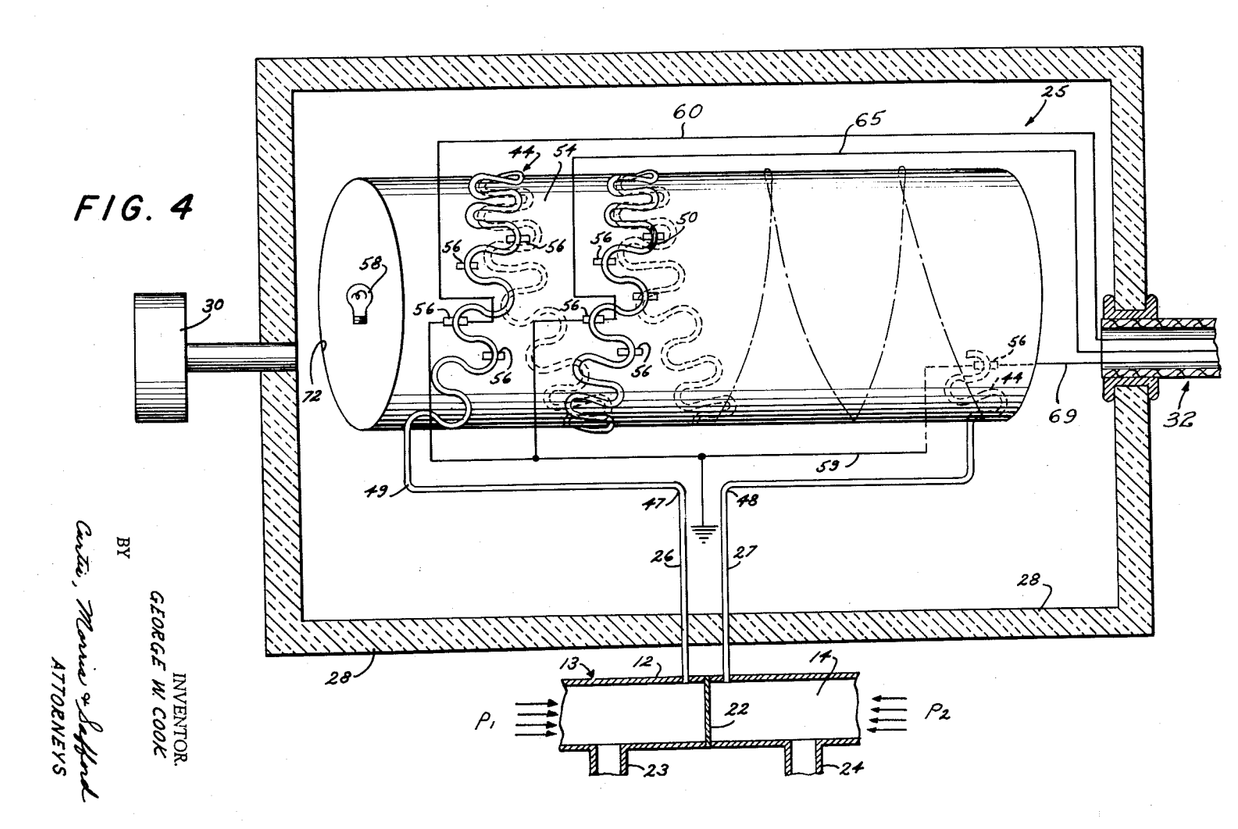

The hydraulic pressure-differential-indicating cell of FIGURE 4 is generally similar to that of FIGURE 2, except that the capillary conduit 44 has a circular inversion pattern and also follows a generally spiral path around the outside surface of a hollow transparent cylinder 72. This cylinder 72 may be glass or transparent plastic such as described above. A source of light 58 is positioned along the axis of the cylinder 72, and light is prevented from passing out through the wall of the cylinder except along the course of the conduit 44 by means of an opaque shield 54. The many small photocells 56 are placed closely adjacent to the outer surface of the conduit 44 at points closely spaced and uniformly spaced along its length so as to indicate the movement of the index element 50 in step-by-step fashion. One terminal of each of these photocells is connected to a common ground bus similar to that shown at 59 in FIGURE 2. The other terminal of each photocell 56 is connected to the computer 34 through an individual lead such as shown at 60, 61, 62, etc. in FIGURE 2, as will be understood. All of these various connection leads are not illustrated in FIGURE 4 so as to make the drawing more easily readable.

Figure 5:
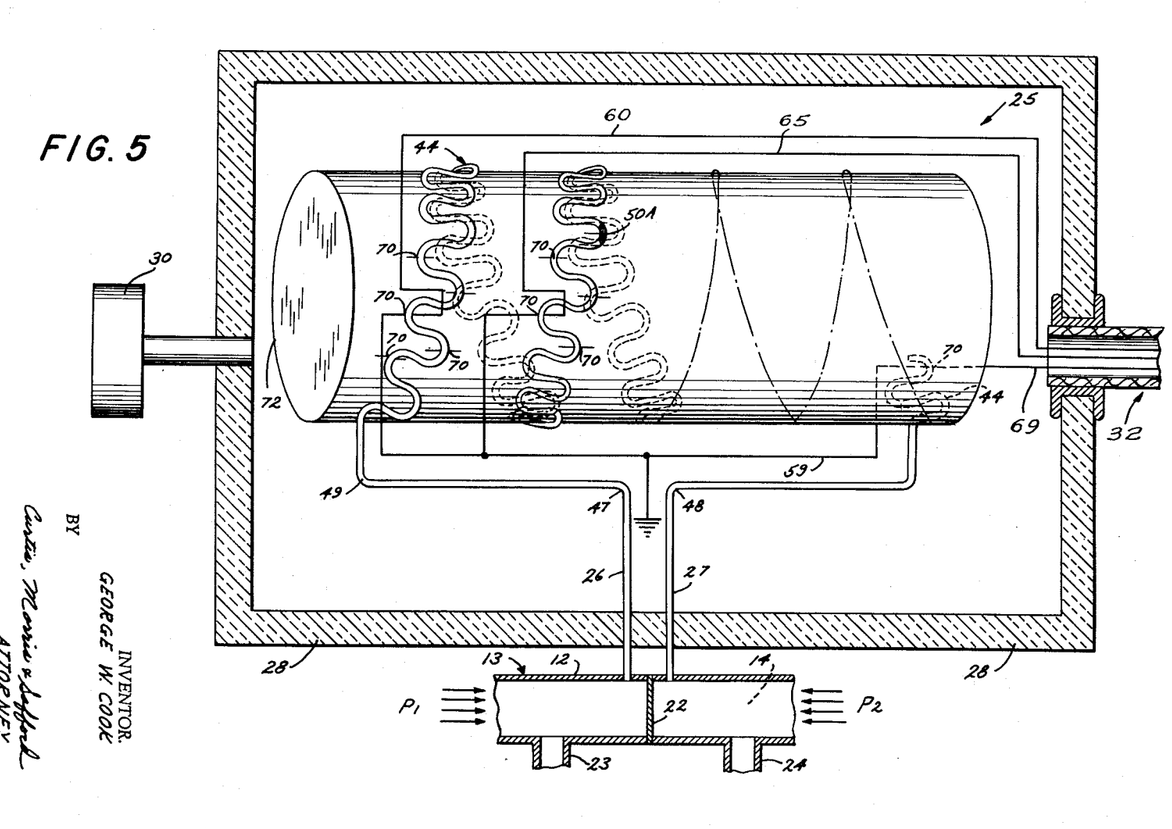

In FIGURE 5, the arrangement of the capillary conduit 44 and the sensing circuits 60, 61, 62, 63, etc. is generally like that of FIGURE 4 except that pairs of electrical contacts 70 are used with an index element 50A of higher resistance than the fluid 49.

Directing attention back to FIGURE 1, it is noted that the computer 34 may be any suitable digital type computer, such as are in use to compute the courses of various craft and to control their movement. This computer 34 includes a matrix code converter in its input for converting the step-by-step input changes, as represented by the changes on the individual leads 60, 61, 62, etc. directly into codified information suitable for operation of the computer. This type of matrix code converter may be of any suitable type such as are in use today.

An advantage of this system is that it enables the elimination of the analogue-to-digital type conversion equipment which is required in other vehicle control systems now in use.

The output from the pair of terminals 35 and 36 is fed over wires 75 and 76 to a motor control circuit 78 which in turn controls an "amplidyne" torque-amplifying motor 80 by means of control leads 81 and 82. A suitable motor control circuit 78 is a thyratron circuit to control the speed and direction of rotation of a control shaft 83. This shaft is supported in a bearing mount 84 and turns a gear 85 and pinion 86 which operates an indicator 88 showing the relative angle of the control surfaces 39 and 40. Also carried on this shaft 83 are a pair of reverse threaded worms 89 and 90 which drive the worm gears 91 and 92, respectively, for turning the control surfaces 39 and 40 in opposite directions.

Assuming that the plane of the accelerometer is oriented transverse to the longitudinal axis of the craft, then the control system will respond to rolling accelerations. The system will control the vanes 39 and 40 so that they can react upon any fluid medium external to the craft to maintain it level, i.e. to stablize the craft against rolling.

From the output terminals 37 and 38 a control signal is fed over leads 95 and 96 to another motor control circuit 78A and a motor 80A generally similar to those at 78 and 80. This motor 80A drives a shaft 97 in either direction at the desired speed to maintain the platform 42 as a horizontal reference athwart the craft, but still referenced to the frame of the craft. This platform 42 may be used to carry linear accelerometers or other devices requiring such a reference support.

A gear 98 drives a pinion 99, and acting through bevel gears 100, it drives an indicator 101 showing the angle of roll of the craft. As shown the platform 42 is mounted on trunnion supports 104 on a pedestal 106 and is driven by a worm 108 engaging a worm gear 109 secured to the platform 42.

For purposes of providing negative feedback control, there is mounted upon the platform a monitor 110, which includes two components: (1) a gravity sensing device, such as a pendulum, which is critically damped and arranged to have a long natural period, and (2) a turn sensitive device in the monitor may, for example, be generally like any one of those described above, except that it may include fewer photocells 56 or pairs of contacts 70 located near the center portion of the capillary conduit 44, because the monitor does not experience angular acceleration except insofar as the relative motion of platform 42 does not exactly compensate for angular movements of the craft. The dual output from the monitor feeds back over a multiple-conductor cable 112 to the terminals 114 of the computer 34. This monitor 110 and cable 112 complete the negative feedback loop for assuring accuracy and stability of operation of the over-all systems for long periods of time.

A suitable size for the bore of the capillary conduit 44 is a value of its radius "r" within the range from 0.001 of an inch to 0.050 of an inch.

From the foregoing it will be understood that the angular accelerometer sensing systems and control methods and apparatus of the present invention described above are well suited to provide the advantages set forth, and since many possible embodiments may be made of the various features of this invention and as the method and apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

What is claimed is:

1. An angular accelerometer system comprising a hydraulic angular accelerometer including a liquid-filled tube arranged in a path around an axis and at least partially enclosing an area as seen in a direction along the axis and wherein a pressure differential is generated between two pressure points spaced along said tube as a function of the direction and magnitude of angular acceleration about said axis, a capillary conduct interconnecting said two pressure points, a fluid medium in said capillary conduit having an index element therein with a characteristic which differs from that of the remaining fluid in said capillary conduit, said index element being adapted to move along said conduit with the movement of said fluid medium in response to the pressure differential between said two points, and sensing means for sensing the movement of said index element along said capillary conduit.

2. An angular accelerometer system comprising a hydraulic angular accelerometer wherein a pressure differential is generated between two pressure points as a function of the direction and magnitude of angular acceleration, a capillary conduit extending between said two pressure points, a fluid medium within said capillary conduit having an index element therein with a characteristic which is distinguishable from that of the remaining fluid in said capillary conduit, said index element moving along said capillary conduit together with the fluid medium in response to the pressure differential between said two points, and a plurality of sensing elements positioned at spaced points along the length of said conduit for sensing the presence of the index element at any one of said points.

3. An angular accelerometer system comprising a liquid-filled tube formed into a substantially closed path, said tube being filled with liquid and having barrier means preventing flow of the liquid through the tube, whereby a pressure difference is generated in opposite ends of the tube near the barrier as a function of the direction and magnitude of angular acceleration, a capillary conduit extending between and opening into opposite ends of said tube, said capillary conduit being filled with said liquid except for a small element therein with a characteristic which differs from that of the liquid, the cross-sectional area of the bore of said conduit being much smaller than the cross-sectional area of the tube, and sensing means for sensing the movement of said element along said capillary conduit in response to the pressure differential between said two points.

4. An angular accelerometer system comprising a liquid-filled tube formed into a substantially closed path and having barrier means preventing flow of liquid through the tube and wherein a pressure difference occurs in opposite ends of the tube near the barrier as a function of the direction and magnitude of angular acceleration, a capillary conduit extending between opposite ends of said tube, a fluid medium in said capillary conduit having a small element therein with a characteristic which differs from that of the remaining fluid in said capillary conduit, and sensing means for sensing the movement of said element along said capillary conduit in response to the pressure differential between said two points.

5. An angular accelerometer system comprising a liquid-filled tube arranged in a loop, barrier means preventing the mass flow of liquid through said tube, whereby a pressure differential is generated within the tube on opposite sides of the barrier means as a function of the direction and magnitude of angular acceleration, a capillary conduit extending between portions of said tube on opposite sides of said barrier means, an opaque fluid medium in said capillary conduit having a pellucid index element therein, a source of light energy irradiating said conduit, and a plurality of photocells at spaced points along said conduit for sensing the movement of said index element along said capillary conduit in response to the pressure differential.

6. A pressure differential indicating cell comprising a capillary conduit of relatively great length having its two ends closely adjacent to each other, said capillary conduit including a plurality of loops arranged in an inversion pattern wherein successive alternate loops are inverted with respect to the intervening loops, an opaque fluid medium in said capillary conduit, a minute globule of pellucid fluid in said conduit, a source of light energy irradiating said conduit, and a plurality of photocell elements at spaced points along the length of said conduits for sensing the presence of said globule.

7. A pressure differential indicating cell as claimed in claim 6 and wherein said capillary conduit follows a generally spiral pattern around a cylindrical support.

8. In an accelerometer system wherein a pressure differential is generated between two pressure points as a function of acceleration, a pressure differential indicating cell comprising a capillary conduit of relatively great length extending between said two points, said capillary conduit including a plurality of loops arranged in an inversion pattern wherein successive alternate loops are inverted with respect to the intervening loops, a liquid medium in said capillary conduit having a predetermined electrical conductivity, a small mass of material in said conduit, said mass being adapted to move along said conduit with the movement of the liquid medium and having an electrical conductivity differing therefrom, and a plurality of pairs of electrical contacts communicating with the interior of said conduit, said pairs of contacts being positioned at spaced points along the length of said conduits for sensing the presence of said small mass.

9. A pressure-differential indicating cell comprising a capillary conduit of relatively great length having its two ends closely positioned, said capillary conduit including a plurality of loops arranged in an inversion pattern wherein successive alternate loops are inverted with respect to the intervening loops, mercury in said capillary conduit, a minute element of light-transmitting matter within said conduit, a source of light irradiating said conduit, and a plurality of photocell elements at spaced points along the length of said conduit for sensing the presence of said minute element of light-transmitting matter.

10. In an angular acceleration system including a hydraulic angular accelerometer wherein a pressure difference occurs between two closely spaced points as a function of angular acceleration, a pressure-differential indicating cell comprising a capillary conduit of relatively great length having its two ends closely adjacent and connected to said two points, said capillary conduit including a plurality of loops arranged in an inversion pattern wherein successive alternate loops are inverted with respect to the intervening loops, a fluid medium in said capillary conduit, a minute index element of dissimilar material in said conduit, and a plurality of sensing elements at spaced points along the length of said conduit for sensing the passage of said index element past any one of said points.

11. In an angular acceleration system as claimed in claim 10, a pressure-differential indicating cell wherein the capillary conduit follows a generally circular path, and said sensing elements are positioned at points spaced uniformly along the length of said conduit.

12. An angular accelerometer system for directly indicating angular velocity comprising a liquid-filled tube formed into a substantially closed path and having barrier means preventing flow of liquid through the tube, whereby a pressure difference is generated in opposite ends of the tube near the barrier as a function of the direction and magnitude of angular acceleration, a capillary conduit extending between opposite ends of said tube, a fluid medium in said capillary conduit having a small element therein with a characteristic which differs from that of the remaining fluid in said capillary conduit, said element having a predetermined position in said conduit at a predetermined angular velocity and sensing means for sensing the displacement of said element along said capillary conduit in either direction from said predetermined position as a direct indication of angular velocity.

13. An angular acceleration sensing system comprising a liquid-filled tube formed into a substantially closed path and wherein the opposite ends of the tube are effectively closed, whereby a difference in pressure is generated in its opposite ends as a function of the direction and magnitude of the component of angular acceleration of the tube in the plane of its path, a liquid-filled capillary conduit having a relatively long length and extending between and communicating with said opposite ends, the cross-sectional area of the bore of said capillary conduit being a small fraction of the cross-sectional area of the interior of the tube, said capillary conduit having a radius within the range from 0.001 of an inch to 0.050 of an inch and sensing means for sensing the movement of the liquid within said conduit.

14. An angular acceleration control system for controlling the angular acceleration of a craft comprising a hydraulic angular accelerometer wherein a pressure differential is generated between two pressure points as a function of the direction and magnitude of angular acceleration, a capillary conduit extending between said two points, a liquid medium filling said capillary conduit and having an index element therein of a characteristic distinguishable from the liquid medium, a plurality of sensing elements at spaced points along said conduit and being responsive to the presence of the index element near respective ones of said points, an electrical control circuit connected to said sensing elements and motor means connected to said electrical control circuit for controlling the angular acceleration of the craft.

15. An angular acceleration control system for controlling the angular acceleration of a craft about a predetermined axis comprising a liquid-filled tube formed into a substantially closed path in a plane perpendicular to said axis, the opposite ends of said tube being effectively closed, whereby a difference in pressure is generated in the opposite ends as a function of the direction and magnitude of the angular acceleration of the craft about said axis, a liquid-filled capillary conduit having a relatively long length and extending between the opposite ends of the capillary conduit, communicating with said opposite ends of said tube, the cross-sectional area of the bore of the conduit being a small fraction of the cross-sectional area of the interior of the tube, the bore of said conduit having a small movable element of a material differing in a characteristic from the liquid therein, said element moving along the conduit with the liquid therein, a plurality of sensing elements at points spaced along the length of said conduit, said sensing elements being actuated in succession as said movable element moves along said conduit, an electrical control circuit connected to each of said sensing elements and responding to the successive actuation of said sensing elements, and motive means connected to said control circuit and controlling the angular acceleration of the craft about said axis in accordance with the successive actuation of said sensing elements.

16. An angular velocity control system for controlling the angular velocity of a craft about a predetermined reference axis comprising a liquid-filled tube arranged in a path extending around said reference axis in a plane perpendicular to said axis, the opposite ends of said tube being effectively closed for generating a pressure differential between the pressures in the liquid at the opposite ends in accordance with the direction and magnitude of angular accelerations about said axis, a capillary conduit extending between the opposite ends of said tube, a liquid medium in said conduit arranged to move along said conduit as a function of said pressure differential, a mass of a material of a distinguishing characteristic in said liquid medium and moving with said liquid medium and forming an index element for indicating the movement of said medium, said index element moving in one or the other direction corresponding with the direction of acceleration and moving to a position along said conduit as a function of the integrated effect of the angular acceleration, whereby the position of said index element indicates angular velocity, a plurality of sensing elements at various positions along said conduit and actuated by said index element at the respective positions thereof, an electrical control circuit connected to each of said sensing elements, and motive means under the control of said circuit for controlling the angular velocity of the craft in accordance with the position of said index element along said conduit.

17. An angular accelerometer system for automatically producing an integration of angular acceleration with respect to time comprising a liquid-filled passage arranged in a path around an axis and at least partially enclosing an area as seen looking in a direction parallel with the axis, said passage having first and second connections thereto at spaced points along its length, means closing off the ends of said passage beyond said connections, thereby producing a pressure difference in the liquid in said passage adjacent said connections as a function of the direction and magnitude of angular acceleration, a capillary conduit extending between said two connections, said capillary conduit having a uniform bore with a cross sectional area of less than $\frac{1}{100}$ the cross sectional area of said passage, said capillary conduit being filled with a fluid medium, an index element in said fluid medium with a characteristic contrasting with the remaining fluid in said capillary conduit, and sensing means for sensing the position of said index element along said capillary conduit, whereby the angular accelerometer system automatically integrates angular accelerations with respect to time and the position of said index along said capillary conduit indicates angular velocity about said axis.

18. An angular accelerometer comprising a liquid-filled passage arranged in a path around an axis and at least partially enclosing an area as seen looking in a direction parallel with the axis, said passage having first and second connections thereto at spaced points along its length, means closing off the ends of said passage beyond said connections, thereby producing a pressure difference in the liquid in said passage adjacent said connections as a function of the direction and magnitude of angular acceleration about said axis, a capillary conduit extending between said two connections, said capillary conduit having a cross sectional area smaller than the cross sectional area of said passage, said capillary conduit being arranged in an inversion pattern and having a relatively great length crowded into a small volume of space, said capillary conduit being filled with a fluid medium, an index element in said fluid medium with a characteristic contrasting with the remaining fluid in said capillary conduit, sensing means for sensing the position of said index element along said capillary conduit, and temperature control means for regulating the temperature of said capillary conduit.

19. An angular velocity control system for controlling the rolling of a craft about its longitudinal axis for stabilizing the craft to maintain it on an even keel comprising a liquid-filled tube arranged in a path extending around the longitudinal axis of the craft generally in a plane perpendicular to the longitudinal axis of the craft, the opposite ends of said tube being effectively closed for generating a differential between the pressures in the liquid at the opposite ends of said tube in accordance with the direction and magnitude of rolling angular accelerations about said longitudinal axis, means for sensing said differential in pressure and for generating an electrical control signal in response to said rolling angular accelerations including a capillary conduit interconnecting the opposite ends of said tube, a fluid medium in said capillary conduit having an index element therein with a characteristic which differs from that of the remaining fluid in said capillary conduit, said index element being adapted to move along said conduit with the movement of said fluid medium in response to the pressure differential between said two points, circuit means responsive to the movement of said index element for generating said control signal, and motive means under the control of said circuit means for stabilizing the craft against rolling.

20. An angular velocity control system for controlling the rolling of a craft about its longitudinal axis for stabilizing the craft to maintain it on an even keel comprising a liquid-filled tube arranged in a path extending about the longitudinal axis of the craft generally in a plane perpendicular to the longitudinal axis of the craft, the opposite ends of said tube being effectively blocked for generating a difference in pressure in the liquid in the opposite ends of said tube as a function of the direction and magnitude of rolling angular acceleration, means for sensing said differential in pressure and for generating an electrical control signal in response to said rolling angular accelerations including a capillary conduit interconnecting the opposite ends of said tube, a fluid medium in said capillary conduit having an index element therein with a characteristic distinguishable from the remaining fluid medium in said capillary conduit, said index element moving along said capillary conduit together with the fluid medium in response to the pressure differential between said two points, apparatus responsive to the movement of said index element for generating said control signal, motive means under the control of said circuit means, and control vanes driven by said motive means, for stabilizing the craft against rolling.

References Cited in the file of this patent

UNITED STATES PATENTS

| | | |
|---|---|---|
| 1,626,567 | Steinbrecht | Apr. 26, 1927 |
| 2,323,003 | Farmer | June 15, 1943 |
| 2,370,000 | Best | Feb. 20, 1945 |
| 2,479,031 | Tait | Aug. 16, 1949 |

FOREIGN PATENTS

| | | |
|---|---|---|
| 131,184 | Great Britain | Aug. 21, 1919 |